United States Patent
Ensign

[19]

[11] Patent Number: 6,146,490

[45] Date of Patent: Nov. 14, 2000

[54] WEB LEADER DEVICE

[75] Inventor: Thomas C. Ensign, Scottsdale, Ariz.

[73] Assignee: Xyron, Inc., Scottsdale, Ariz.

[21] Appl. No.: 09/182,197

[22] Filed: Oct. 30, 1998

Related U.S. Application Data

[60] Provisional application No. 60/063,593, Oct. 30, 1997.

[51] Int. Cl.[7] ..................................................... B30B 15/34
[52] U.S. Cl. ...................... 156/324.4; 156/555; 156/580; 156/582; 156/583.1
[58] Field of Search ..................................... 156/555, 580, 156/582, 583.1, 324.4

[56] References Cited

U.S. PATENT DOCUMENTS

| | | | |
|---|---|---|---|
| 3,047,051 | 7/1962 | Matveeff | 156/539 |
| 3,598,684 | 8/1971 | Militana et al. | 156/583.5 X |
| 3,870,582 | 3/1975 | Brackett et al. | 156/581 X |
| 4,199,391 | 4/1980 | Andrews | 156/324.4 |
| 5,580,417 | 12/1996 | Bradshaw | 156/495 |
| 5,584,962 | 12/1996 | Bradshaw et al. | 156/495 |
| 5,641,370 | 6/1997 | Sanko | 156/228 |
| 5,762,752 | 6/1998 | Sawano et al. | 156/580 |

*Primary Examiner*—James Sells
*Attorney, Agent, or Firm*—Pillsbury Madison & Sutro LLP

[57] ABSTRACT

The present invention relates to a leader device for initially feeding web materials between a set of nip rollers. The device comprises a pair of leg portions each having a nip roller engageable exterior surface and a web material engaging interior surface. The leg portions have connected end portions defining a leading end portion and free end portions movable apart from one another. The leg portions are configured such that a user can position leading edges of the web materials between the interior surfaces such that the leading edges are aligned with respect to one another and thereafter grasp the web materials between the leg portions by moving the leg portions together so as to engage the interior surfaces with the web materials, thereby enabling the user to insert the leading edge portion between the nip roller such that the nip rollers engage the exterior surfaces and thereafter affect nip roller rotation so as to feed the device along with the web materials through the nip rollers until the device is subsequently discharged and disengageable from the web materials. The present invention also relates to a method for feeding web materials between nip rollers.

44 Claims, 3 Drawing Sheets

WEB LEADER DEVICE

The present application claims priority to U.S. Provisional application of Ensign, Jr., Ser. No. 60/063,593, filed Oct. 30, 1997, the entirety of which is incorporated into the present application by reference.

The present invention relates to a device to assist in feeding the leading edge of a web of material in between a set of nip rollers and, more specifically, to a device that will assist in accurately feeding a web between the nip rollers used in a laminating or adhesive transfer apparatus.

In the field of feeding a web or sheet of film material of finite length for a job of the type which requires frequent replacement of the supply roll or cartridge of the material, the time involved in accurately initiating feeding of the web material to a set of nip rollers can be unacceptably long. In many cases, users of the apparatus that employ such web materials or films have been required to accept significant losses of web material that becomes damaged as a result of the attempts to feed the web material initially to the rollers. These losses usually arise as a result of the need to continue feeding beyond the leading edge of a web to attain a smooth and even feeding of the web material. Where the web material is relatively costly, such losses can quickly become prohibitive. Additionally, manually handling the materials during such insertion can cause adhesives coated on the materials to transfer to the operator's hands.

In the field of lamination where multiple plies or webs of material must be fed to nip rolls that apply pressure while drawing the web material from a supply cartridge or cartridges, accurate feeding of each web to the nip rolls is of paramount importance particularly where accurate registration between the plies must be achieved and maintained.

The present invention provides an inexpensive and easily utilized leader device which will accurately feed the leading edge of a web initially between the nip rolls of apparatus such as a laminating machine such as are disclosed in U.S. Pat. Nos. 5,580,417 and 5,584,962 and which will eliminate substantially all waste previously encountered in feeding web material to nip rollers.

Specifically the present invention provides in combination with a pair of supply rolls of flexible web materials and an apparatus having a set of nip rollers, a web leader device for initially feeding flexible web materials in between the set of nip rollers. The device of the present invention comprises a pair of leg portions each having a nip roller engageable exterior surface and a web material engaging interior surface. The leg portions have connected end portions defining a leading edge portion and free end portions movable apart from one another. The leg portions are positioned and configured such that a user can position unwound lead end portions of the web materials in between the interior surfaces thereof with leading edges of the web materials aligned with respect to one another and thereafter grasp the web materials between the leg portions by engaging the interior surfaces with the web materials, thereby enabling the user to (1) insert the leading edge portion between the nip rollers such that the nip rollers engage the exterior surfaces and (2) thereafter nip roller rotation so as to feed the device along with the web materials through the nip rollers until the device is subsequently discharged and disengageable from the web materials.

The web leader device of the present invention may optionally further comprise a resilient clip with a pair of opposed leg engaging portions. The clip is mounted on the leading edge portion such that inner surfaces of the engaging portions engage the exterior surface of the leg portions so as to resiliently clamp the leg portions together without manual assistance. The resiliency of the clip is such that the leg portions and the engaging portions can be moved apart to allow the leading edges of the materials to be positioned between the leg portions and the engaging portions can thereafter be allowed to resiliently return towards one another so as to move the leg portions together and engage the interior surfaces with the web materials. It can be appreciated that the resilient clip is advantageous because the operator does not have to continually apply manual pressure to keep the leg portions together.

Another aspect of the present invention relates to a method for initially feeding flexible materials from a pair of wound supply rolls in between a set of nip rollers. The method comprises providing a web leader device comprising a pair of leg portions each having nip roller engageable exterior surfaces and a web material engaging interior surface. The leg portions have connected end portions defining a leading edge portion and free ends movable from one another. Unwound lead end portion of the web materials are positioned in between the interior surfaces such that the leading edges of the web materials are aligned with respect to one another. Then the interior surfaces are engaged with the web materials so as to grasp the web materials between the leg portions. The leading edge portion of the device is thereafter fed between the nip rollers such that the nip rollers engage the exterior surfaces. Nip roller rotation is thereafter affected to feed the device along with the web materials through the nip rollers until the device is subsequently discharged and disengageable from the web materials.

Other objects, features, and advantages will become apparent from the following detailed description, the accompanying drawings, and the appended claims.

BRIEF DESCRIPTION OF THE DRAWINGS

A complete understanding of the present invention will be had by reference to the following description taken in conjunction with the accompanying drawings, in which.

DETAILED DESCRIPTION OF THE INVENTION

Figure 1:
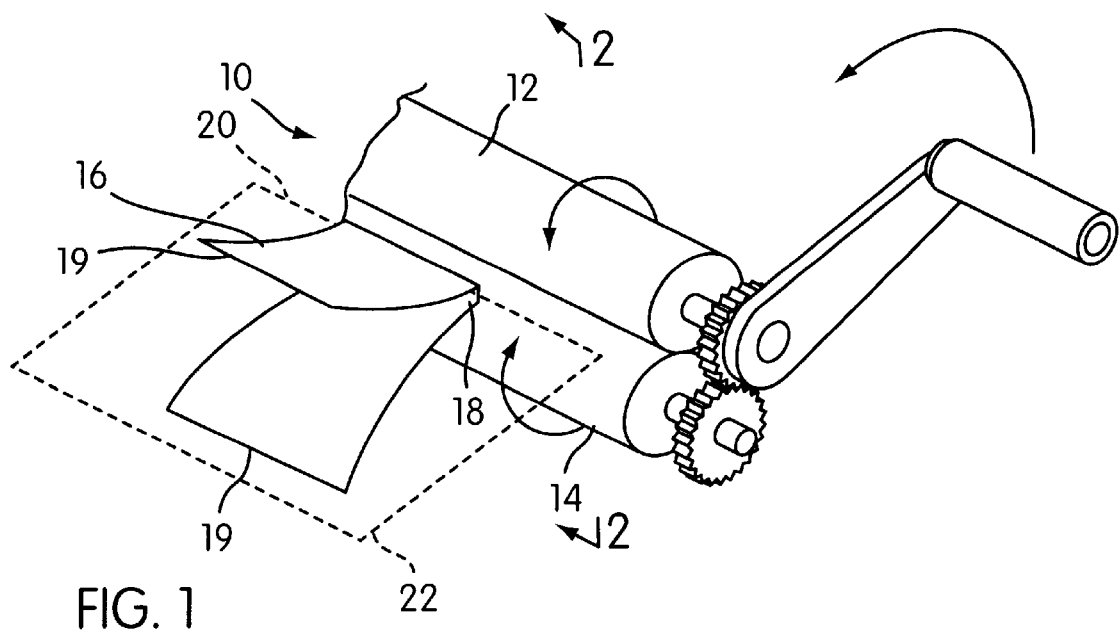
FIG. 1 is a perspective view of a leader device of the present invention as it is being fed to a pair of nip rollers.

FIG. 1 shows a perspective view of a pair of cooperating pressure applying structures in the form of nip rollers 12, 14 of a laminating or adhesive transfer apparatus such as those disclosed in U.S. Pat. Nos. 5,580,417 and 5,584,962, the disclosures of which are incorporated herein by reference. Preferably, the nip rollers 12, 14 will be of the type where one is fixed for rotation about an axis while the other of the nip rollers is spring biased towards the first nip roller with a selected degree of pressure being exerted on material fed between the nip rollers.

The leader device 16 of the present invention is used by inserting unwound lead end portions of the web materials 22 which have been unwound from the supply rolls mounted to the apparatus frame into the base 18 so that the leading-edges 20 of the web material 22, shown in broken lines in FIG. 1, will be generally parallel to the leading edge portion of the device 16. If desired, a manufacturer of the supply cartridge may incorporate the leader device in the cartridge during manufacture thereof. In one form, the leader device can be disposed between two webs of a cartridge to assist a user in feeding the webs to the nip rollers.

Figure 2:
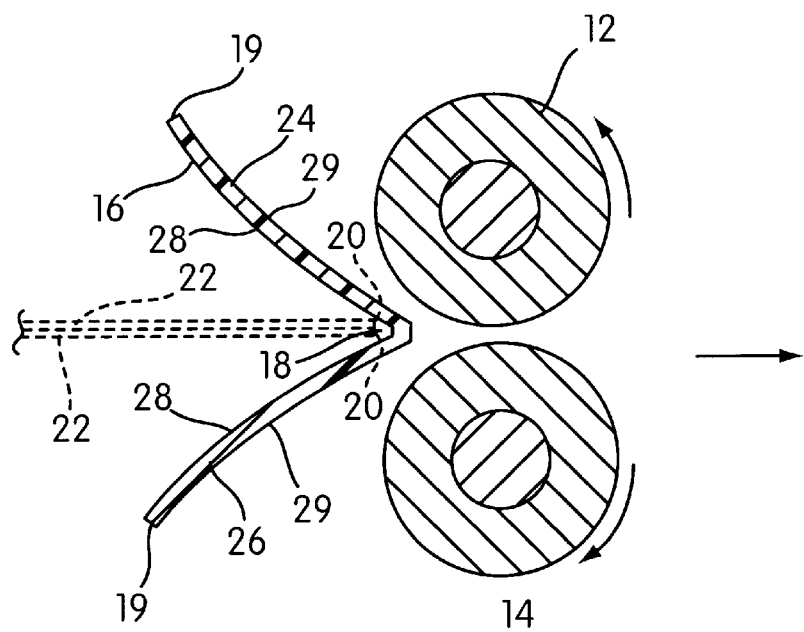
FIG. 2 is a sectional view along lines 2—2 of FIG. 1.

Referring to FIG. 2, the leader device 16 is formed with two leg portions 24 and 26 which extend arcuately from the leading edge portion 18 as shown to free end portions 19. The leading edge portion 18 is defined by connected end portions. It can be appreciated from the Figures that the device 16 is formed from a folded one-piece member. Preferably, the device is plastic, but cardboard or other materials may also be used. Web material engaging interior surfaces 28 and nip roller engageable exterior surfaces 29 of the leg portions 24 and 26 may be roughened to assist in gripping the web material as well as to assist the user in positioning the leader device 16 on the leading edges 20 of the web materials 22 taken from a supply cartridge as well as facilitate handling while inserting the device 16 in the bite of the nip rollers 12 and 14 as shown in FIG. 2.

The leg portions 24, 26 are positioned and configured such that the operator can position leading edges 20 of the unwound lead end portions of the web materials 22 in between the interior surfaces 29 with the leading edges 20 properly aligned with respect to one another. The web materials 22 can then be grasped between the leg portions 24, 26 by moving the leg portions 24, 26 together so as to engage the interior surfaces 28 with the materials 22. In the embodiment of FIG. 1, the leg portions 24, 26 are moved together by applying manual pressure, however such movement may be accomplished by other means such as the clip shown in the embodiment of FIG. 4. The leading edge portion 18 can then be inserted between the nip rollers 12, 14 such that the nip rollers 12, 14 engage the exterior surfaces 29 and nip roller rotation can thereafter be affected to feed the device along with the materials 22 through the nip rollers 12, 14 until the device is subsequently discharged and disengageable from the materials 22.

Figure 3:
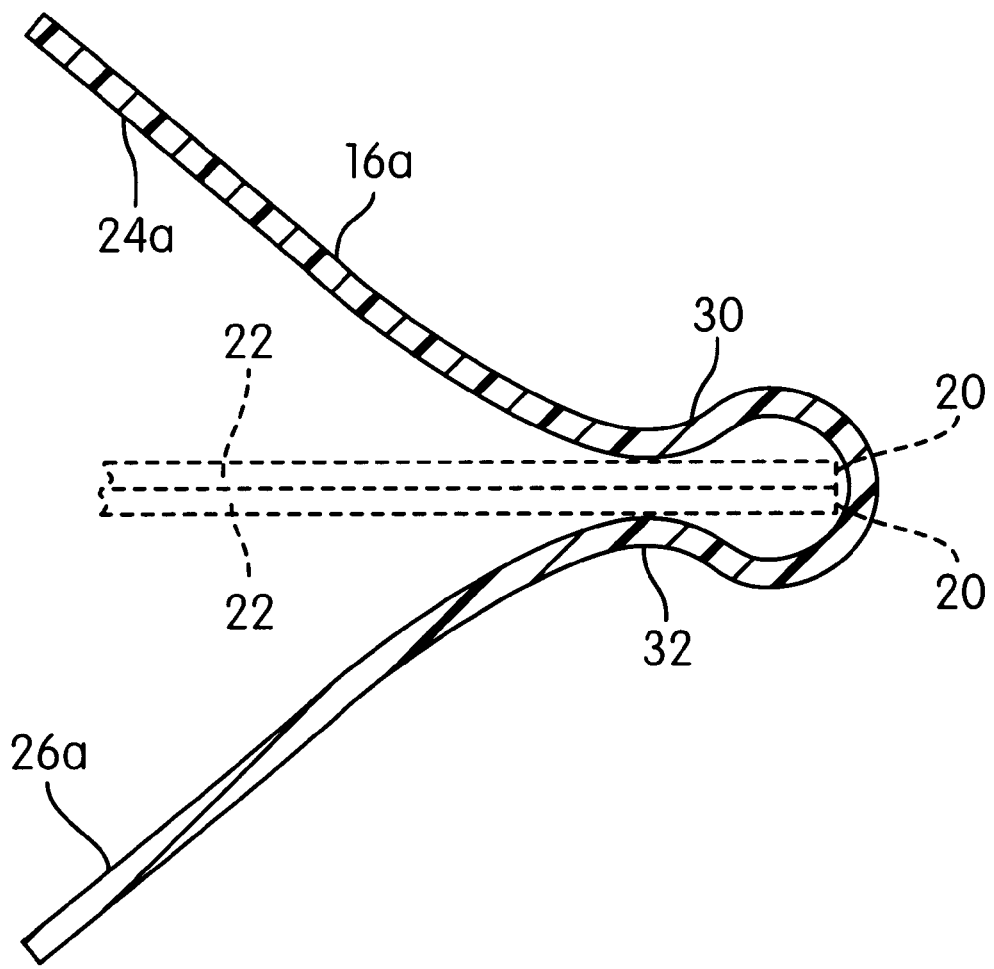
FIG. 3 is a section view similar to FIG. 2 but showing an alternate embodiment with a gripping recess.

In FIG. 3, a modified form of the invention is shown at 16a where a gripping recess 30 is provided at the leading edge portion 18a and which includes a pinching portion 32 the interior surfaces of which will engage the web materials 22 with a slight pressure to assist in retaining the device 16a on the leading edges 20 of the materials 22.

The width of the devices 16, 16a may be selected to accommodate the width of the web materials 22 being fed to the rollers 12, 14. It will be appreciated that due to its inherent stiffness relative to most web material, grasping the leg portions 24 and 26 with one hand will be much easier than grasping opposite sides of flexible web materials 22 with both hands.

The leader devices 16, 16' may be molded as a single piece from a suitable plastic such as polyethylene, vinyl or the like. Spring metal and even cardboard have also proved useful In the manufacture of the device, it is important that the overall thickness as measured when the leg portions 24 and 26 are compressed against an inserted web's leading-edge does not exceed ⅛ of an inch. An overall thickness of between ¹⁄₁₆ to ⅛ of an inch should suffice for most applications.

Figure 4:
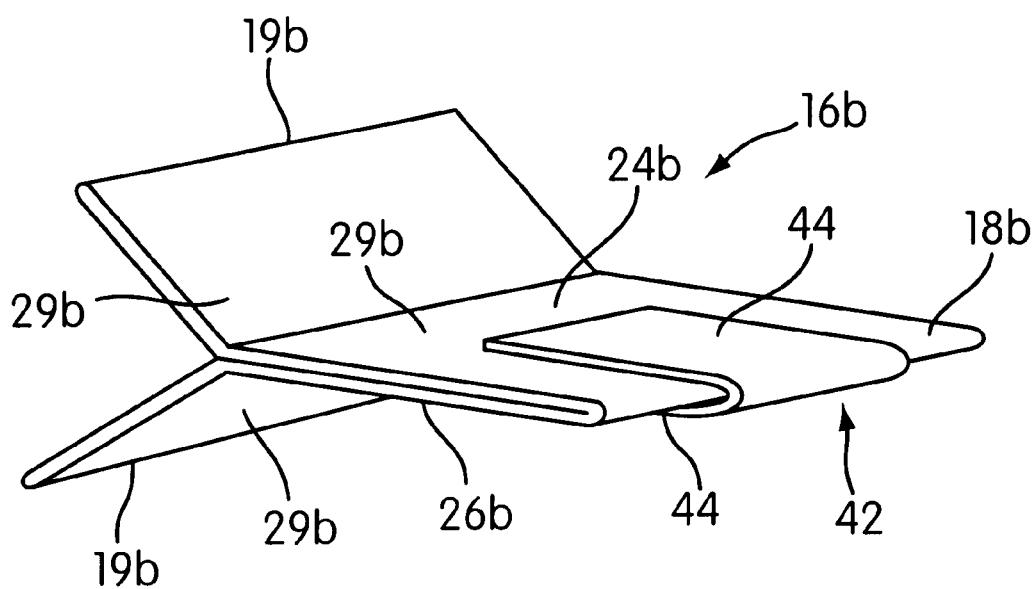
FIG. 4 is a perspective view of second alternate embodiment of the present invention.

FIG. 4 illustrates a second embodiment of the present invention. The device 16b of FIG. 4 is made of one folded plastic member. The leg portions 24b, 26b are angled at an intermediate portion rather than being arcuate as in FIGS. 1–3. The leading edge portion 18b is defined by the fold line and the leg portions 24b, 26b extend rearwardly to the angled intermediate portion in parallel relation. A resilient clip 42 has a pair of spaced apart leg engaging portions 44. The clip 42 may be made of plastic, spring steel, or other resilient material.

The clip 42 is mounted on the leading edge portion 18b such that inner surfaces of the engaging portions 44 engage the exterior surfaces 29b so as to resiliently clamp the leg portions 24b, 26b together. The resiliency of the clip 42 is such that the leg portions 24b, 26b and engaging portions 44 can be moved apart to allow the web materials to be positioned between the leg portions 24b, 26b and the engaging portions 44 can thereafter resiliently return towards one another so as to move the leg portions 24b, 26b together and engage the interior surfaces with the web materials.

It is to be understood that the above-described specific embodiments have been provided to illustrate the functional and structural principles of the present invention and are not intended to be limiting. To the contrary, the invention encompasses all modifications and alterations within the spirit and scope of the appended claims.

It should be noted that the use of claim language in the "means for performing a specified function" format of 35 U.S.C. §112, paragraph 6 has been omitted from the appended claims. This makes clear that the applicant does not intend the claims to be interpreted under §112, paragraph 6 so as to be limited solely to the structures disclosed and their structural equivalents.

What is claimed is:

1. A method for initially feeding flexible web materials from a pair of wound supply rolls in between a set of nip rollers, said method comprising:

providing a web leader device comprising a pair of leg portions each having a nip roller engageable exterior surface and a web material engageable interior surface, said leg portions having connected end portions defining a leading edge portion and free ends movable apart from one another;

positioning unwound lead end portions of the web materials in between said interior surfaces such that leading edges of the web materials are aligned with respect to one another;

then engaging said interior surfaces with the web materials so as to grasp the web materials between said leg portions;

thereafter inserting said leading edge portion of said device between the nip rollers such that the nip rollers engage said exterior surfaces; and thereafter affecting nip roller rotation to feed said device along with the web materials through the nip rollers until said device is subsequently discharged and disengageable from the web materials.

2. A method according to claim 1, wherein the leg portions of said leader device are substantially more rigid than said web materials.

3. The method of claim 2, wherein said connected end portions of said leader device are formed integrally together.

4. The method of claim 3, wherein said leg portions comprise a one-piece folded member, said leading edge being defined as the portion extending along said fold.

5. The method of claim 4, wherein said folded member is plastic.

6. The method of claim 4, wherein said folded member is cardboard.

7. The method of claim 5, wherein said leading edge portion has a recess for facilitating manually moving said leg portions together.

8. The method of claim 2, wherein said device has a total thickness between said exterior surfaces of ⅛ of an inch or less when said interior surfaces are engaged with the web materials.

9. The method of claim 8, wherein said device is plastic.

10. The method of claim 2, wherein said leg portions curve arcuately away from one another towards said free end portions thereof.

11. The method of claim 2, wherein said device further comprises a resilient clip with a pair of opposing leg engaging portions, said clip being mounted on said leading edge portion such that inner surfaces of said engaging portions engage said exterior surfaces of said leg portions so as to resiliently clamp said leg portions together, said method further comprising:
- before said positioning, moving said leg portions apart against the resiliency of the clip to allow the web materials to be positioned therebetween;
- wherein said engaging comprises allowing said engaging portions to resilient return towards one another so as to move said leg portions together.

12. The method of claim 11, wherein said clip comprises spring steel.

13. The method of claim 11, wherein said clip comprises plastic.

14. In combination with a pair of supply rolls of flexible web materials, and an apparatus having a set of nip rollers a web leader device for initially feeding said flexible web materials in between said nip rollers, said device comprising:
- a pair of leg portions each having a nip roller engageable exterior surface and a web material engageable interior surface;
- said leg portions having connected end portions defining a leading edge portion and free end portions movable apart from one another;
- said leg portions being positioned and configured such that a user can position unwound lead end portions of the web materials in between said interior surfaces thereof with leading edges of the web materials aligned with respect to one another and thereafter grasp the web materials between said leg portions by engaging said interior surfaces with the web materials, thereby enabling the user to (1) insert said leading edge portion between the nip rollers such that the nip rollers engage said exterior surfaces and (2) thereafter affect nip roller rotation so as to feed said device along with the grasped web materials through the nip rollers until said device is subsequently discharged and disengageable from the web materials.

15. A combination according to claim 14, wherein the leg portions of said leader device are substantially more rigid than said web materials.

16. A combination according to claim 15, wherein said connected end portions of said leg portions are formed integrally together.

17. A combination according to claim 16, wherein said leg portions comprise a one-piece folded member, said leading edge portion being defined as the portion extending along said fold.

18. A combination according to claim 17, wherein said one-piece folded member is plastic.

19. A combination according to claim 18, wherein said leading edge portion has a recess for facilitating manually moving said leg portions together.

20. A combination according to claim 15, wherein said device has a total thickness between said exterior surfaces of ⅛ of an inch or less when said interior surfaces are engaged with the web materials.

21. A combination according to claim 17, wherein said folded member is cardboard.

22. A combination according to claim 20, wherein said device is plastic.

23. A combination according to claim 15, wherein said leg portions are formed from a resilient material and curve arcuately away from one another towards said free end portions thereof with the resiliency of said material tending to keep said leg portions curved arcuately away from one another.

24. A combination according to claim 18, wherein said web leader device further comprises a resilient clip with a pair of opposed leg engaging portions, said clip being mounted on said leading edge portion such that inner surfaces of said engaging portions engage said exterior surfaces of said leg portions so as to resiliently clamp said leg portions together without manual assistance,
- the resiliency of said clip being such that said leg portions and said engaging portions can be moved apart to allow the leading edges of the web materials to be positioned between the leg portions and said engaging portions can thereafter be allowed to resiliently return towards one another so as to move said leg portions together and engage said interior surfaces with the web materials.

25. A combination according to claim 24, wherein said clip comprises spring steel.

26. A combination according to claim 24, wherein said clip comprises plastic.

27. A web leader device for initially feeding web materials in between a set of nip rollers, said device comprising:
- a pair of leg portions each having a nip roller engageable exterior surface and a web material engageable interior surface;
- said leg portions having connected end portions defining a leading edge portion and free ends movable apart from one another;
- a resilient clip with a pair of opposed leg engaging portions, said clip being mounted on said leading edge portion such that inner surfaces of said leg engaging portions engage said exterior surfaces of said leg portions so as to resiliently clamp said leg portions together without manual assistance;
- the resiliency of said clip being such that said leg portions and said leg engaging portions can be moved apart to allow a user to position leading end portions of the web materials between said leg portions with the leading edges of the materials aligned with one another and such that the said leg engaging portions can thereafter be allowed to resiliently return towards one and another so as to move said leg portions together and thereby engage said interior surfaces thereof with the web materials to grasp the web materials therebetween, thereby enabling the user to (1) insert the leading edge portion between the nip rollers such that the nip rollers engage the exterior surfaces of the leg portions and (2) thereafter affect nip roller rotation so as to feed said device along with the grasped web materials through the nip rollers until said device is subsequently discharged and disengageable from the web materials.

28. A device according to claim 27, wherein said connected end portions of said leg portions are formed integrally together.

29. A device according to claim 28, wherein said leg portions comprise a one-piece folded member, said leading edge portion being defined as the portion extending along said fold.

30. A device according to claim 29, wherein said one-piece folded member is plastic.

31. A device according to claim 27, wherein said clip comprises spring steel.

32. A device according to claim 27, wherein said clip comprises plastic.

33. A web leader device for feeding said flexible web materials in between a set of nip rollers, said device comprising:

a pair of leg portions each having a nip roller engageable exterior surface and a web material engageable interior surface;

said leg portions having connected end portions defining a leading edge portion and free end portions movable apart from one another, said leading edge portion having a recess for facilitating manually moving said leg portions together;

said leg portions being positioned and configured such that a user can position lead end portions of the web materials in between said interior surfaces thereof with leading edges of the web materials aligned with respect to one another and thereafter grasp the web materials between said leg portions by engaging said interior surfaces with the web materials, thereby enabling the user to (1) insert said leading edge portion between the nip rollers such that the nip rollers engage said exterior surfaces and (2) thereafter affect nip roller rotation so as to feed said device along with the grasped web materials through the nip rollers until said device is subsequently discharged and disengageable from the web materials.

34. A device according to claim 33, wherein said connected end portions of said leg portions are formed integrally together.

35. A device according to claim 34, wherein said leg portions comprise a one-piece folded member, said leading edge portion being defined as the portion extending along said fold.

36. A device according to claim 35, wherein said one-piece folded member is plastic.

37. A method for feeding flexible web materials in between a set of nip rollers, said method comprising:

providing a web leader device comprising a pair of leg portions each having a nip roller engageable exterior surface, and a web material engageable interior surface, said leg portions having connected end portions defining a leading edge portion and free ends movable apart from one another, said device further comprising a resilient clip with a pair of opposing leg engaging portions, said clip being mounted on said leading edge portion such that inner surfaces of said engaging portions engage said exterior surfaces of said leg portions so as to resiliently clamp said leg portions together;

moving said leg portions apart against the resiliency of said clip;

positioning the web materials in between said interior surfaces such that leading edges of the web material are aligned with respect to one another;

allowing said leg engaging portions to resiliently return towards one another by the resiliency of said clip so as to move said leg portions together, thereby engaging the interior surfaces of said leg portions with the web materials to grasp the web materials between the leg portions;

thereafter affecting nip roller rotation to feed said device along with the web materials through the nip rollers until said device is subsequently discharged and disengageable from the web materials.

38. The method of claim 37, wherein said connected end portions of said leader device are formed integrally together.

39. The method of claim 38, wherein said leg portions comprise a one-piece folded member, said leading edge being defined as the portion extending along said fold.

40. The method of claim 37, wherein said clip comprises spring steel.

41. The method of claim 37, wherein said clip comprises plastic.

42. A method for feeding flexible web materials in between a set of nip rollers, said method comprising:

providing a web leader device comprising a pair of leg portions each having a nip roller engageable exterior surface and a web material engageable interior surface, said leg portions having connected end portions defining a leading edge portion and free ends movable apart from one another, said leading edge portion having a recess for facilitating manually moving said leg portions together;

positioning the web materials in between said interior surfaces such that leading edges of the web materials are aligned with respect to one another;

then moving said leg portions together while engaging said recess to engage said interior surfaces with the web materials so as to grasp the web materials between said leg portions;

thereafter inserting said leading edge portion of said device between the nip rollers such that the nip rollers engage said exterior surfaces; and thereafter affecting nip roller rotation to feed said device along with the web materials through the nip rollers until said device is subsequently discharged and disengageable from the web materials.

43. In combination with a pair of supply rolls of flexible web and an apparatus having a pair of cooperating pressure applying structures, a web leader device for initially feeding said flexible web materials in between said pressure applying structures, said device comprising:

a pair of leg portions each having an exterior surface and an interior surface;

said leg portions having connected end portions defining a leading edge portion and free end portions movable apart from one another;

said leg portions being positioned and configured such that a user can position unwound lead end portions of the web materials in between said interior surfaces thereof with leading edges of the web materials aligned with respect to one another and thereafter grasp the web materials between said leg portions by engaging said interior surfaces with the web materials, thereby enabling the user to (1) insert said leading edge portion between said pressure applying structures such that said pressure applying structures engage said exterior surfaces and (2) thereafter advance said device along with the grasped web materials through the pressure applying structures until said device is subsequently discharged and disengageable from the web materials.

44. A method for initially feeding web materials from a pair of wound supply rolls in between a set of pressure applying structures, said method comprising:

providing a web leader device comprising a pair of leg portions each having an exterior surface and an interior surface, said leg portions having connected end portions defining a leading edge portion and free ends movable apart from one another;

positioning unwound lead end portions of the web materials in between said interior surfaces such that leading edges of said web materials are aligned with respect to one another;

then engaging said interior surfaces with the web materials so as to grasp the web materials between said leg portions;

thereafter inserting said leading edge portion of said device between the pressure applying structures such that the pressure applying structures engage said exterior surfaces; and thereafter advancing said device along with the grasped web materials through the pressure applying structures until said device is subsequently discharged and disengageable from the web materials.

* * * * *